United States Patent [19]

Iwashita

[11] Patent Number: 5,654,619
[45] Date of Patent: Aug. 5, 1997

[54] METHOD OF FEEDFORWARD CONTROL FOR SERVOMOTOR

[75] Inventor: Yasusuke Iwashita, Oshino-mura, Japan

[73] Assignee: Fanuc Ltd, Minamitsuru-gun, Japan

[21] Appl. No.: 533,649

[22] Filed: Sep. 25, 1995

[30] Foreign Application Priority Data

Sep. 26, 1994 [JP] Japan .................................. 6-254211

[51] Int. Cl.$^6$ .................................................. G05B 21/02
[52] U.S. Cl. .......................... 318/636; 318/610; 318/609; 318/560; 388/800; 364/148
[58] Field of Search ............................. 318/636, 610, 318/609, 560, 568.22, 569, 571, 635, 632; 388/800, 842, 906, 902, 907.5; 364/148, 164, 174, 178, 424.05

[56] References Cited

U.S. PATENT DOCUMENTS

| | | | |
|---|---|---|---|
| 4,802,777 | 2/1989 | Yamada | ................................... 318/569 |
| 5,393,087 | 2/1995 | Taniguchi et al. | ............. 364/424.05 X |

Primary Examiner—Karen Masih
Attorney, Agent, or Firm—Staas & Halsey

[57] ABSTRACT

A control method of a servomotor, such that a moving command for position-velocity processing, which is executed in every sampling period obtained by dividing a distribution period of moving commands into N units of equal parts, is determined from the above described moving commands of the distribution period. A velocity compensatory component is obtained on the basis of a moving command in a distribution period preceding by one period the present distribution period and is added to a velocity command, and an acceleration compensatory component obtained on the basis of a moving command preceding the time of the present position-velocity loop processing is added to a torque command, so that the phase of acceleration compensatory data is advanced from that of velocity compensatory data in feedforward operations.

11 Claims, 9 Drawing Sheets

FIG. 2(a) MOVING COMMAND
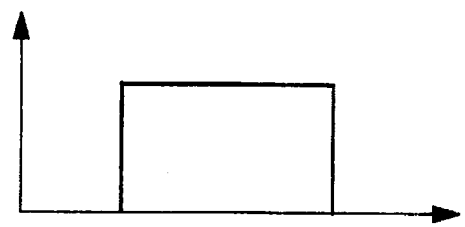
FIG. 2(b) VELOCITY COMPENSATORY COMPONENT
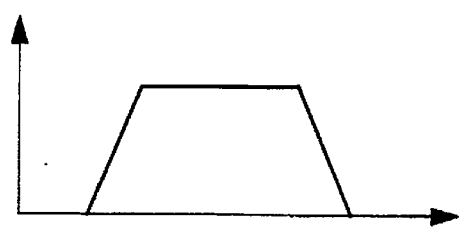
FIG. 2(c) ACCELERATION COMPENSATORY COMPONENT k=0
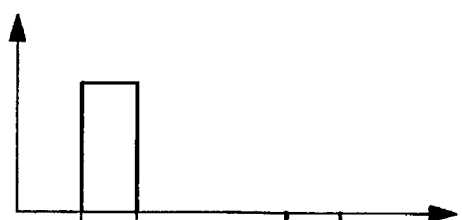
FIG. 2(d) ACCELERATION COMPENSATORY COMPONENT k=0.5
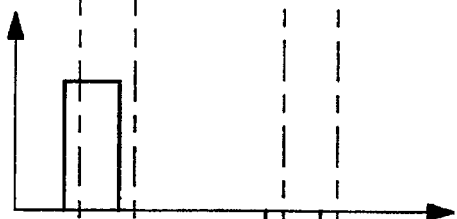
FIG. 2(e) ACCELERATION COMPENSATORY COMPONENT k=1
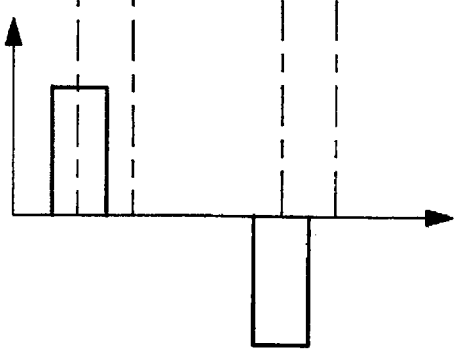

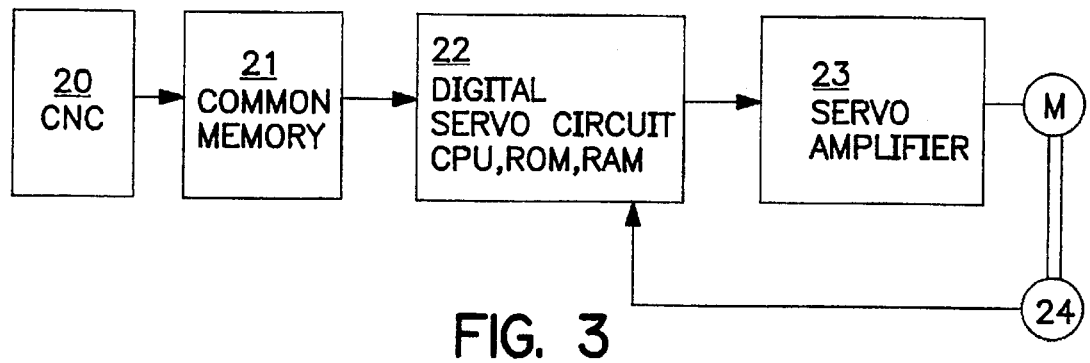
FIG. 3
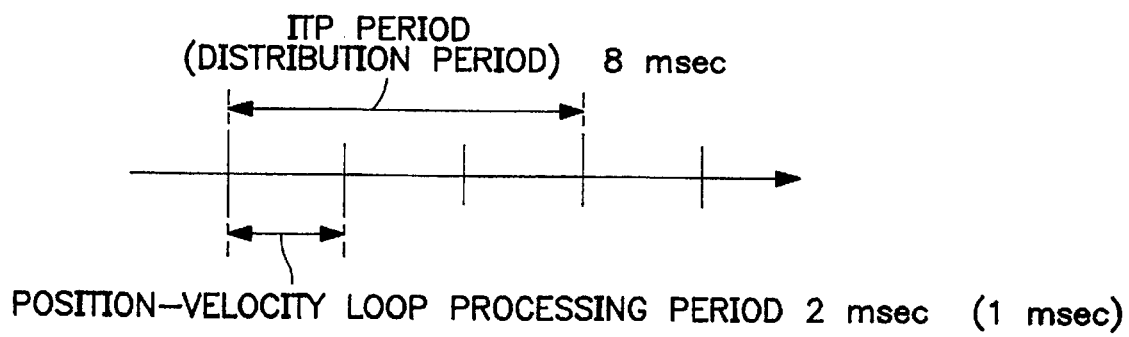
FIG. 4
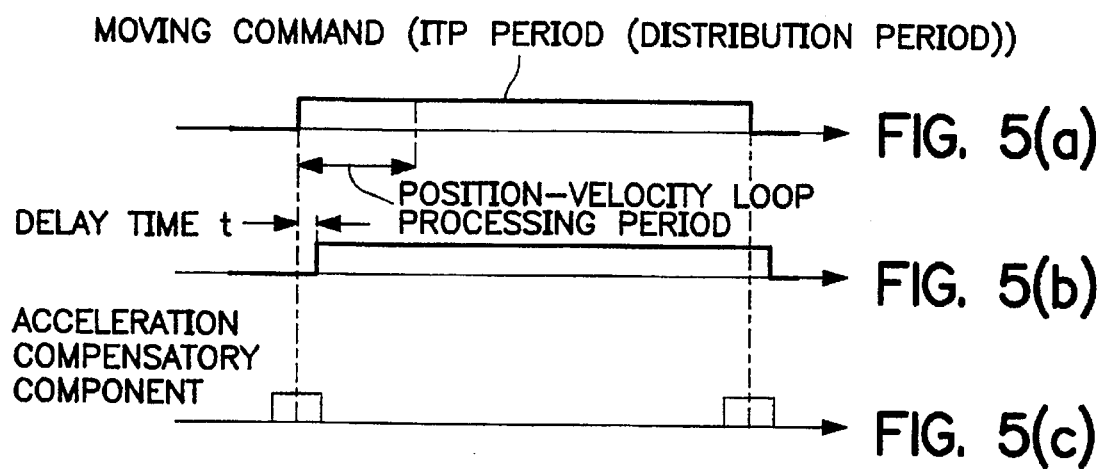

IN CASE OF k=0

IN CASE OF k=0.5

IN CASE OF k=1

FIG. 10(a) MOVING COMMAND

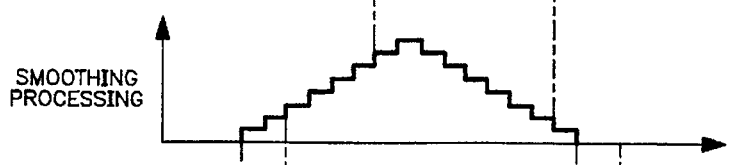

FIG. 10(b) SMOOTHING PROCESSING

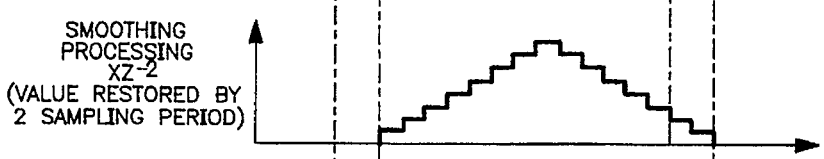

FIG. 10(c) SMOOTHING PROCESSING XZ⁻² (VALUE RESTORED BY 2 SAMPLING PERIOD)

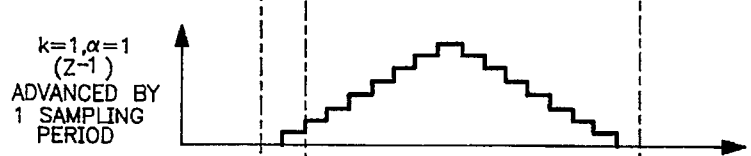

FIG. 10(d) $k=1, \alpha=1$ $(Z^{-1})$ ADVANCED BY 1 SAMPLING PERIOD

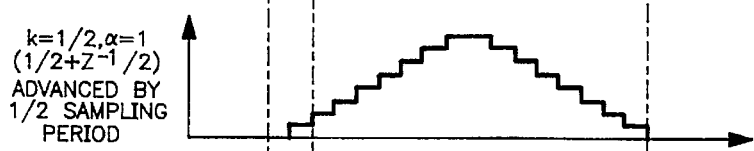

FIG. 10(e) $k=1/2, \alpha=1$ $(1/2+Z^{-1}/2)$ ADVANCED BY 1/2 SAMPLING PERIOD

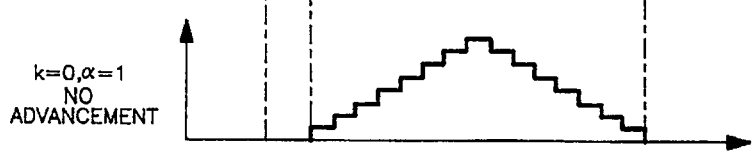

FIG. 10(f) $k=0, \alpha=1$ NO ADVANCEMENT

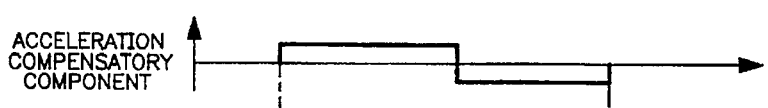

FIG. 10(g) ACCELERATION COMPENSATORY COMPONENT

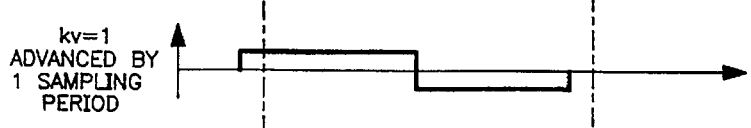

FIG. 10(h) $kv=1$ ADVANCED BY 1 SAMPLING PERIOD

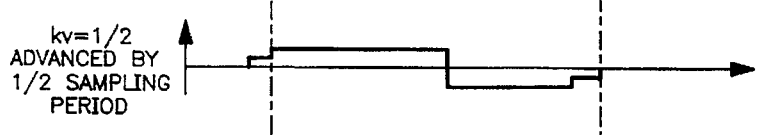

FIG. 10(i) $kv=1/2$ ADVANCED BY 1/2 SAMPLING PERIOD

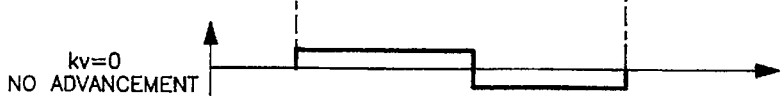

FIG. 10(j) $kv=0$ NO ADVANCEMENT

SPECIFIED PROFILE
(ERROR AMOUNT IS INDICATED BY SCALE OF 500 TIMES MAGNIFICATION)

SPECIFIED PROFILE
(ERROR AMOUNT IS INDICATED BY SCALE OF 500 TIMES MAGNIFICATION)

METHOD OF FEEDFORWARD CONTROL FOR SERVOMOTOR

BACKGROUND OF THE INVENTION

1. Field of the Invention

This invention relates to a method for controlling a servomotor, and particularly, to a method for controlling a servomotor which drives feed rods of a machine tool or robotics arms.

2. Description of the Related Art

In controlling feed rods of a machine tool, robotics arms or the like being driven by a servomotor, particularly during high speed cutting by a machine tool, there arises an error in profiling a work piece due to a follow-up delay of the servo system. For this reason, to minimize such profile error, sometimes feedforward control is applied to the positional loop.

More specifically, a value obtained by multiplying a differentiated value of a moving command (positional command) by a feedforward coefficient is added to a velocity command obtained by usual positional loop processing, whereby positional deviation is reduced to compensate the servo delay.

In general, a moving command is transferred from a numerically controlled device or the like to a positional loop on the side of a servo circuit in every distribution period. Such distribution period (interpolation (ITP) period) is generally about 8 msec, while a period of the positional loop or the velocity loop inside the servo circuit is around 2 msec or 1 msec.

In the positional loop, the ITP period is divided by the positional loop period, and it is controlled so that moving command values for the divided positional loop periods become equal to one another. Thus, as described above, even if an acceleration-deceleration time constant is afforded to a moving command outputted from a numerically controlled device, values of moving commands remain equal to each other during the respective positional loops in every position-velocity loop processing period in one ITP period, so that changes in magnitude of a moving command appear between the processing of a positional loop and that of another positional loop in which the ITP period changes. For this reason, significant changes in a moving command occur between positional loops where the ITP period changes.

In a feedforward term, when the moving command is differentiated to determine a velocity command, a value of the velocity command increases to include high frequency components. Consequently, follow-up becomes difficult in the velocity loop, and the swell appears in positional deviation. A poor control in the velocity loop becomes a cause of a remarkable shock to the movement of a motor or a machine.

As a means for eliminating the disadvantage described above, the present applicant has disclosed a method for controlling a servomotor in which acceleration-deceleration processing is inserted into a feedforward term of positional control and that of velocity control, whereby smoothing processing for removing the above described swell is carried out (Japanese Patent Laid-open No. 15911/1991).

However, the above described smoothing processing contains a problem such that swell and the like in positional deviation appear at the time of acceleration-deceleration in a positional loop control system. In this respect, the present applicant has further disclosed a feedforward control method in Japanese Patent Laid-open No. 19861/1993, in which a smoothing processing is applied to equalize the moving commands during the present position-velocity loop processing period utilizing the moving command outputted later than the present ITP period, and the value obtained by this smoothing processing, as the feedforward amount, is added to the moving command obtained by the ordinary position loop processing.

FIG. 13 is a block diagram for explaining a method of feedforward control for a servomotor. Reference numeral 1 designates a DDA (Digital Differential Analyzer) for dividing moving commands MCMD delivered from a CNC (numerically controlled device built into computer) in every distribution period (ITP period) into moving commands in every position-velocity loop processing period, 2 an error counter for determining positional deviation by adding the moving commands outputted from the DDA 1 to each other and subtracting moving amounts of the servomotor in every respective position-velocity loop processing period therefrom, 3 a term for determining a velocity command by multiplying the positional deviation stored in the error counter by a position gain Kp, 4 a term of velocity loop containing an integration constant k1 and a proportional constant k2, 5 and 6 terms each being a transfer function of the servomotor where Kt represents a torque constant and Jm represents motor inertia, 10 and 11 terms each being a transfer function of a machine connected to the servomotor where Km is a spring constant, Cm is a viscosity term, and J1 is machine inertia, 12 a term of a transfer function for converting a velocity into a position, 7 a term of smoothing processing means, and 8 a term for determining a feedforward amount FFp of position from the smoothing data SMD obtained by the smoothing processing means where k represents a parameter to be adjusted in response to characteristics and changes in acceleration of the machine connected to the servomotor, and a represents a feedforward coefficient of position, respectively.

In the smoothing processing means 7, the operation represented by the following equation (1) is executed to determine a mean value SMD of moving commands. In the term 8, the mean value SMD thus obtained is multiplied by the feedforward coefficient α to obtain the positional feedforward amount Ffp.

$$\text{The mean value SMD} = Z^d (1+Z^{-1}+Z^{-2} \ldots +Z^{-(N-1)}).\text{(divided MCMD)}/N \ldots \quad (1)$$

where N is a value obtained by dividing the ITP period by the position-velocity loop period, $Z^{-1}$ represents a delay of the position-velocity loop processing period, and $Z^d$ is an advancement element. In this case, d is made to be about ½ of the above described N. For example, when N is 8, d is 4 in the case of FIG. 13.

Furthermore, the reference numeral 9 designates a term for determining a velocity feedforward amount FFv from the mean value SMD where Ts is the position-velocity loop period.

As described above, while a torque command has been determined assuming that there is no delay in the current loop in a conventional feedforward control method for a servomotor, there is, actually however, a rise time constant in the current loop, so that the torque command does not directly correspond to actual torque, and thus, there is a problem about the responsibility of the current loop. The responsibility of the current loop largely affects a major part of changes in acceleration, when a feedforward control operation is executed. In other words, since changes in a moving command are differentiated in the feedforward term, a major part of the change in acceleration is produced by velocity feedforward, if the workpiece to be machined has a contour causing large changes in acceleration.

OBJECTS AND SUMMARY OF THE INVENTION

An object of the present invention is to solve the above described problems of prior art and to provide a method of feedforward control for a servomotor in which a delay in rise of a current loop is compensated for a good command follow-up capability.

The present invention is summarized as follows.

According to the present invention, in controlling a servomotor, a moving command in position-velocity processing, which is executed in every sampling period to be obtained by dividing a distribution period of moving commands into N equal periods, is obtained from the above described moving commands of the distribution period, whereby, a positional feedforward amount (velocity compensatory data) obtained on the basis of a moving command in a distribution period preceding by one period to the present distribution period is added to a velocity command. A velocity feedforward amount (acceleration compensatory data) obtained on the basis of a moving command preceding the time of the present position-velocity loop processing is added to a torque command, so that the phase of the acceleration compensatory data is advanced from that of the velocity compensatory data in feedforward operations. In this case, the phase difference between the acceleration compensatory data and the velocity compensatory data is produced by employing moving commands generated with a time lag.

The velocity compensatory data is obtained in a manner such that a moving command in the distribution period preceding by one period a certain distribution period is read to determine moving commands; with respect to N units of position-velocity loop processing periods centering around a period of each position-velocity loop processing, a moving mean value is determined from the moving commands corresponding to these periods; and the determined moving mean value is multiplied by a positional feedforward coefficient.

Furthermore, the acceleration compensatory data is obtained in a manner such that the moving average value of the moving commands, corresponding to N units of position-velocity loop processing periods centering around the period preceding the period of the position-velocity loop processing used for obtaining the velocity compensatory component, is obtained, and the differentiated value of the obtained moving average value is multiplied by the velocity feedforward coefficient.

Moreover, according to the present invention, one sampling period can be set as a unit of a time lag, or as a time lag set within one sampling period.

BRIEF DESCRIPTION OF THE DRAWINGS

FIGS. 2(a), 2(b), 2(c), 2(d), and 2(e) are diagrams each explaining a relationship between compensatory components in the feedforward control method according to the present invention;

FIG. 3 is a block diagram showing a servomotor control system to which the present invention is applied;

FIG. 4 is a diagram for explaining a relationship between an ITP period (distribution period) and a position-velocity loop processing period;

FIGS. 5(a), 5(b), and 5(c) are schematic diagrams each showing a temporal phase relationship between a positional command and an acceleration compensatory component;

FIGS. 10(a), 10(b), 10(c), 10(d), 10(e), 10(f), 10(g), 10(h), 10(i), and 10(j) are time charts each showing a moving command, data of smoothed moving commands, and acceleration compensatory components in the feedforward control according to the present invention;

DETAILED DESCRIPTION OF THE PREFERRED EMBODIMENTS

To clarify the characteristic features of the present invention, the embodiments of the present invention will be described hereinbelow by referring to the accompanying drawings.

Figure 1:
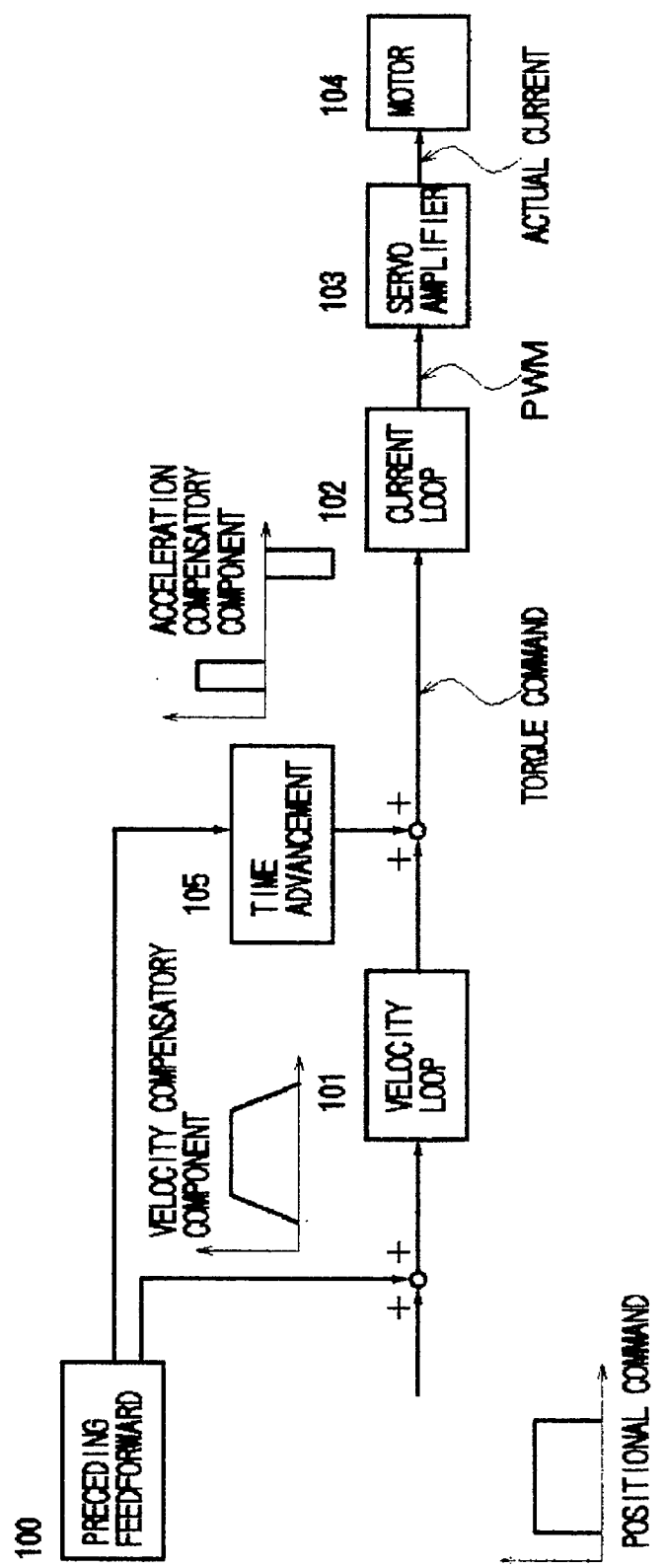
FIG. 1 is a schematic block diagram for explaining the feedforward control method according to the present invention.

FIG. 1 is a schematic block diagram for explaining the feedforward control method according to the present invention wherein reference numeral 100 designates a term of preceding feedforward, 101 a velocity loop, 102 a current loop, 103 a servo amplifier, 104 a motor, and 105 a term for temporally advancing a phase of an acceleration compensatory component from that of a velocity compensatory component, respectively. A moving command is transferred to the current loop through the velocity loop. To the velocity loop the velocity compensatory component is applied, while to the current loop the acceleration compensatory component is applied.

Accordingly, a torque command including the velocity compensatory component and the acceleration compensatory component is inputted to the current loop.

In the feedforward control method according to the present invention, the phase of data of the acceleration compensatory component to be added to the current loop is advanced from that of the velocity compensatory component by means of the time advancing term 105. As a result, to the current loop 102 the velocity compensatory component by means of feedforward and the acceleration compensatory data whose phase is advanced from that of the aforesaid velocity compensatory component are applied. The acceleration compensatory data, the phase of which has been advanced, executes acceleration control of a motor in a faster phase from that of the acceleration compensation by means of a usual feedforward operation, thereby offsetting a delayed amount of the torque command in the current loop.

Thus, the command follow-up capability is an area in which acceleration change is large.

FIGS. 2(a) through 2(e) are diagrams each explaining a relationship between a velocity compensatory component and an acceleration compensatory component in the feedforward control method according to the present invention. FIG. 2(a) indicates a moving command, FIG. 2(b) indicates a velocity compensatory component, and FIGS. 2(c) through 2(e) show acceleration compensatory components, respectively. For instance, when the moving command indicated in FIG. 2(a) is inputted to the feedforward control system shown in FIG. 1, the velocity compensatory component indicated in FIG. 2(b) as well as the acceleration compensatory components shown in FIGS. 2(c) through 2(e) are formed in the preceding feedforward term 100. The velocity compensatory component is applied to the velocity loop 101, while the acceleration compensatory components are applied to the current loop 102 via the time advancing term 105. The time advancing term 105 advances the phases of the acceleration compensatory components from that of the velocity compensatory component. Each constant k in FIGS. 2(c) through 2(e) indicates a degree of advance by means of the time advancing term 105. The constant k=0 means a case where no time advancement is carried out, the constant k=1 means a case where the time advancement is carried out by a predetermined amount, and the constant k=0.5 means a case where the time advancement is effected by half of the predetermined amount.

Acceleration compensatory data in a usual feedforward control method according to the prior art correspond to that of FIG. 2(c). On the other hand, for the acceleration compensatory components (FIGS. 2(d) and 2(e)) determined by the constants other than "0", the phases are advanced with respect to the acceleration compensatory component of FIG. 2(c) Wherein the constant k is "0", and with respect to the positional command shown in FIG. 2(a), the phase is also advanced for application.

In FIG. 1, the time advancing term 105 is separated from the preceding feedforward term 100, but it is not necessarily required to be separated, and its equivalent may also be incorporated into the preceding feedforward term 100.

In the case where the feedforward control is carried out by digital processing, a phase advancement amount of the acceleration compensatory component by means of the time advancing term 105 can be adjusted by the unit of a sampling period obtained by dividing the distribution period of the moving command into N equal parts and of integer times of the value of the sampling period, or of a minute amount in one sampling period. Furthermore, the advancement amount can also be adjusted by combining a rough adjustment based on the unit of sampling period with a fine adjustment based on one sampling period.

The adjustment of an advancement amount based on one sampling period can be achieved by feeding forward the moving command data (future data) whose phase is advanced by one sampling period unit. Moreover, a fine adjustment within one sampling period can be attained by adjusting a moving command whose phase has been advanced by one sampling period unit by a constant k within one sampling period. Consequently, delay in motor current response can be adjusted by one sampling period unit or by a time unit shorter than that of one sampling period.

FIG. 3 is a block diagram showing a servomotor control system to which the present invention is applied, wherein the configuration thereof is the same as that of a conventional digital servo control system. Thus, only the outline of configuration of the system will be described herein.

In FIG. 3, reference numeral 20 designates a numerically controlled device provided internally with a computer (CNC), 21 a common RAM, 22 a digital servo circuit containing a processor (CPU), a digital servo circuit including ROM, RAM and the like, 23 a servo amplifier such as a transistor inverter, M a servomotor, and 24 a pulse coder which produces pulses with rotations of the servomotor M, respectively. FIG. 3 shows only a single-shaft servomotor.

The CNC 20 writes a moving command MCMD in the common RAM in every ITP period (distribution period), and the CPU of the digital servo circuit 22 reads the moving command MCMD from the common RAM 21 to perform position-velocity loop processing in period $T_S$ which is obtained by dividing the above described ITP period into N equal parts (ITP=$T_S$×N). In every ITP period, the moving command in the position-velocity loop processing in the period $T_S$ is determined in order that the moving command MCMD outputted from the CNC 20 is equally distributed during the ITP period (publicly known DDA processing). Then, position loop processing is carried out by employing the moving command and feedback pulses from the pulse coder 24, and at the same time, the. feedforward control processing of positions, which will be described later, is executed to determine a velocity command. Then, the velocity command and feedback pulse from the pulse coder 24 are used to execute velocity loop processing, and at the same time, feedforward processing is carried out with respect to the velocity to determine a torque command (current command). Then, current loop processing is carried out to produce a PWM command, so that the servomotor M is driven through the servo amplifier 23.

FIG. 4 is a diagram for explaining a relationship between the ITP period (distribution period) and the position-velocity loop processing period, wherein the ITP period is usually about 8 msec, while the periods of the position loop and the velocity loop within the servo circuit are about 2 msec or about 1 msec respectively. In FIG. 4, when the period $T_S$ of the position-velocity loop processing is 2 msec, the ITP period is equally divided into four equal parts.

FIGS. 5(a), 5(b), and 5(c) are schematic diagrams each showing the temporal phase relationship between a moving command and an acceleration compensatory component. FIG. 5(a) shows the moving command in every ITP period (distribution period), FIG. 5(b) shows the time at which the torque due to the moving command is actually produced, and that the produced torque rises or falls after delay time t from the time at which the moving command is generated depending on its time constant, and FIG. 5(c) shows the acceleration compensatory component according to the control method of the present invention and based on the moving command, whereby the amount of delay time in FIG. 5(b) is compensated by advancing the rising phase or the falling phase of the acceleration compensatory component in response to the moving command.

Figure 6A:
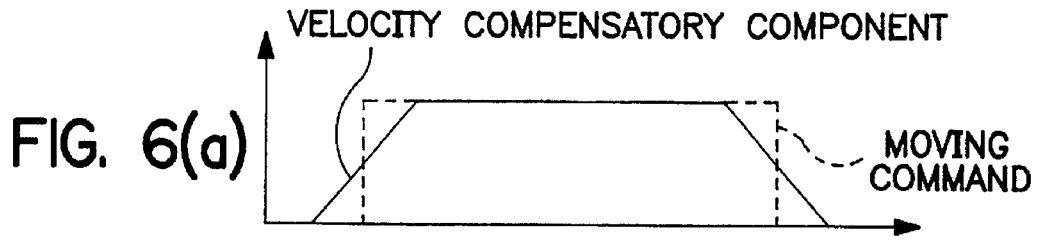
FIGS. 6(a) and 6(b) are diagrams each showing a moving command, a velocity compensatory component, and an acceleration compensatory component in the case where a phase of velocity compensation is required to coincide with that of acceleration compensation.
Figure 6B:
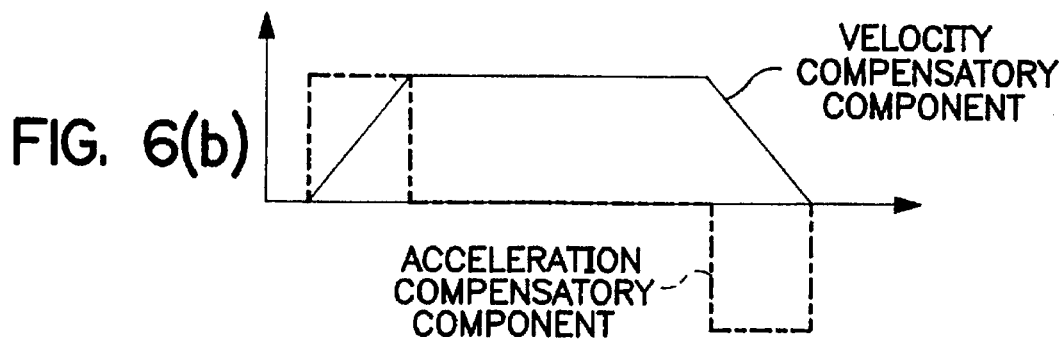
Figure 7A:
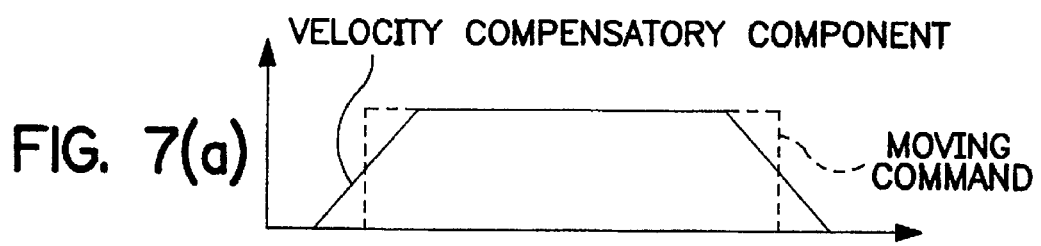
FIGS. 7(a) and 7(b) are diagrams each showing a moving command, a velocity compensatory component, and an acceleration compensatory component in the case where a phase of acceleration compensation is advanced from that of velocity compensation by a period of time corresponding to a half of one sampling period.
Figure 7B:
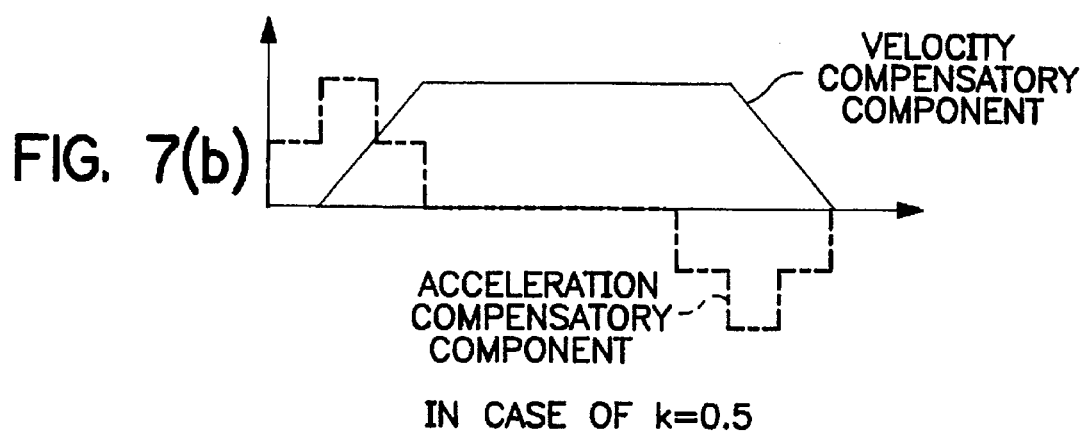
Figure 8A:
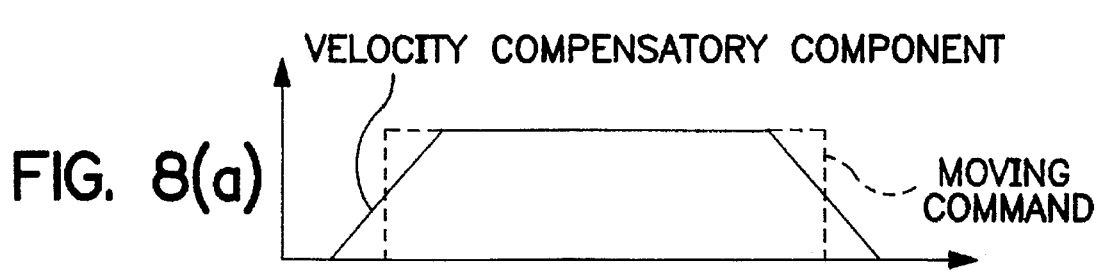
FIGS. 8(a) and 8(b) are diagrams each showing a moving command, a velocity compensatory component, and an acceleration compensatory component in the case where a phase of acceleration compensation is advanced from that of velocity compensation by a period of time corresponding to one sampling period.
Figure 8B:
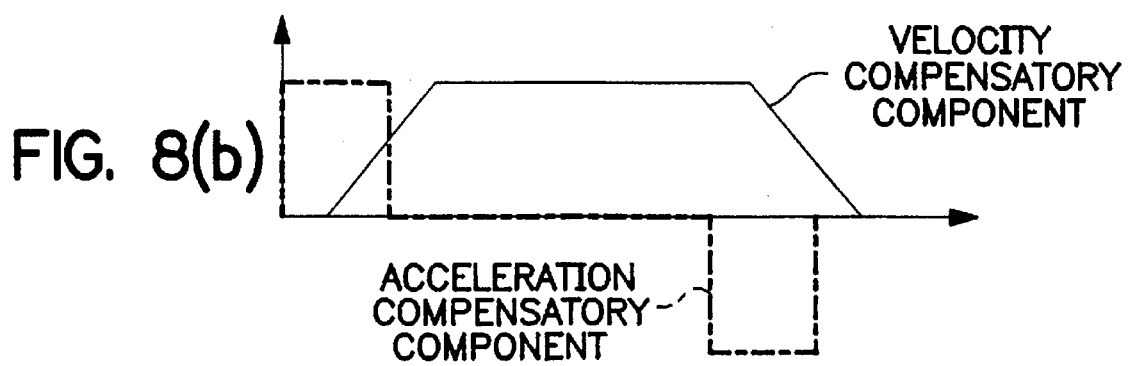

FIGS. 6(a) and 6(b) through FIGS. 8(a) and 8(b), inclusive, are diagrams each showing a relationship between a moving command and a velocity compensatory component, and the relationship between the moving command and an acceleration compensatory component respectively, wherein changes in the acceleration compensatory component with constant k (described later) are illustrated. FIGS. 6(a) and 6(b) respectively indicate a case where the constant k=0, and phases of velocity compensation and acceleration compensation are made to coincide with each other. FIGS. 7(a) and 7(b) respectively indicate a case where the constant k=0.5, and a phase of the acceleration compensation is advanced by one half of one sampling period in comparison with that of the velocity compensation. FIGS. 8(a) and 8(b) respectively indicate a case where the constant k=1, and a phase of the acceleration compensation is advanced by one sampling period in comparison with that of the velocity compensation. In FIGS. 6(a) and 6(b) through FIGS. 8(a) and 8(b), the moving commands are indicated by broken lines, the velocity compensatory components by solid lines, and the acceleration compensatory components by single-dotted lines, respectively.

In the case where the phase of the velocity compensation is required to coincide with that of the acceleration compensation, the constant k is made to be zero, whereby the acceleration compensatory component with advanced phase is made to be zero, so that only the acceleration compensatory component without advance of phase is effective as shown in FIG. 6(b). In the case where the phase of the acceleration compensation is advanced by the half of one sampling period from that of the velocity compensation, the constant k is made to be 0.5, and ½ of the acceleration compensatory component whose phase is advanced by one sampling period is added to ½ of the acceleration compensatory component whose phase is not advanced to obtain the acceleration compensatory component as shown in FIG. 7(b). Furthermore, in the case where the phase of the acceleration compensation is advanced by one sampling period from that of the velocity compensation, the constant k is made to be 1, whereby the acceleration compensatory component without advance of the phase is made to be zero, so that only the acceleration compensatory component whose phase is advanced by one sampling period is effective as shown in FIG. 8(b).

Figure 13:
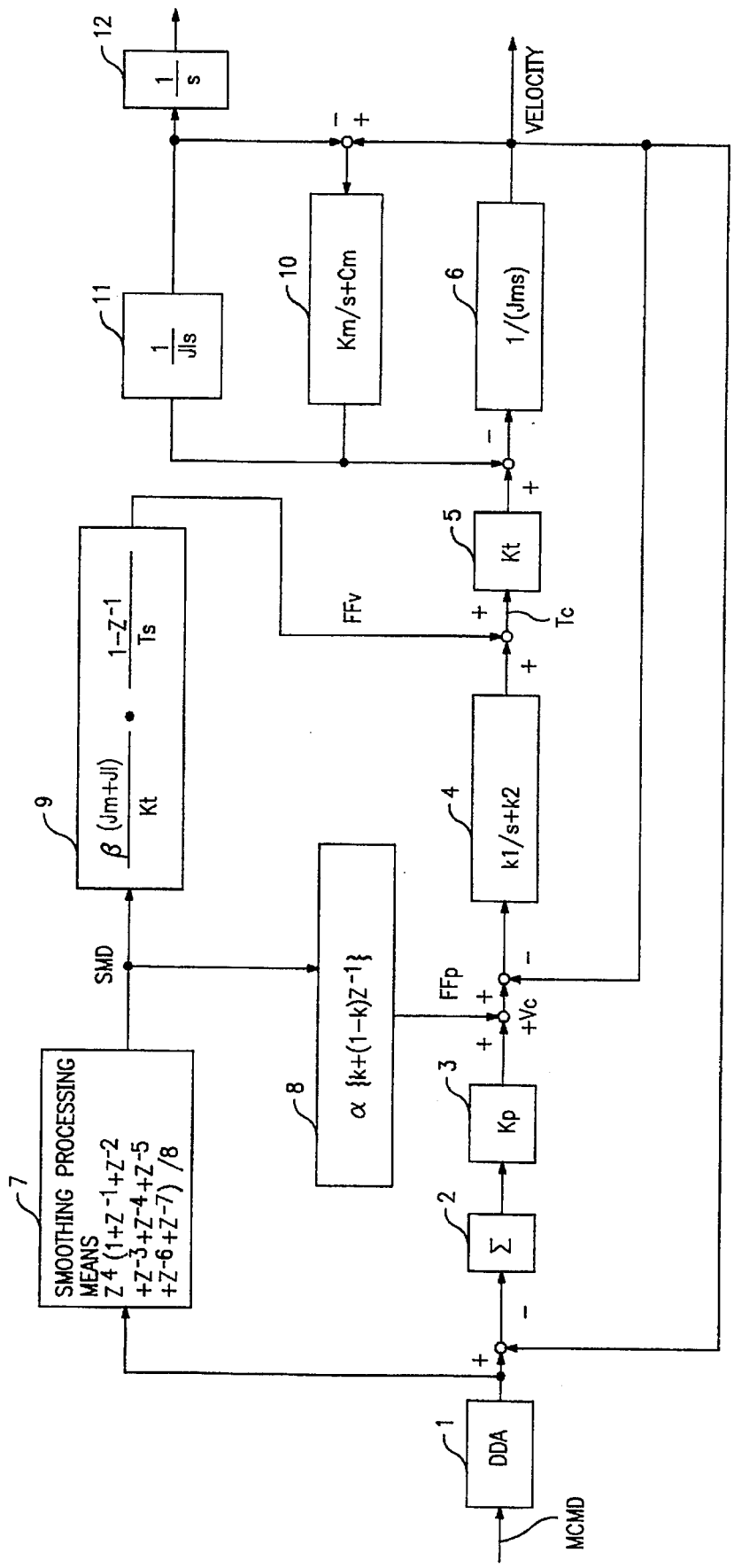
FIG. 13 is a block diagram for explaining a conventional feedforward control method.

Next, an embodiment of the servo system for practicing the feedforward control method according to the present invention will be described referring to FIG. 9. The block diagram of FIG. 9 is substantially the same as that of the above-mentioned FIG. 13, wherein only the processed data in the smoothing processing means 7, the term 13, and the term 14 differ from those of FIG. 13.

Only the different parts configuration will be described hereinbelow. The smoothing processing means 7 performs smoothing processing by using the data which have been advanced by an n sampling period with respect to the moving command after a DDA1 to determine a mean value SMD. The term 13 is the one which performs processing of "$Z^{-n}$" for restoring the amount corresponding to the n sampling period which has been advanced in the smoothing processing means 7, and the term 13 is placed between the smoothing processing means 7 and term 8 for adjusting feedforward amount for position.

Moreover, the term 14 is the one for adjusting an advancement amount of a velocity feedforward amount FFv, and is placed after the term 9.

Figure 9:
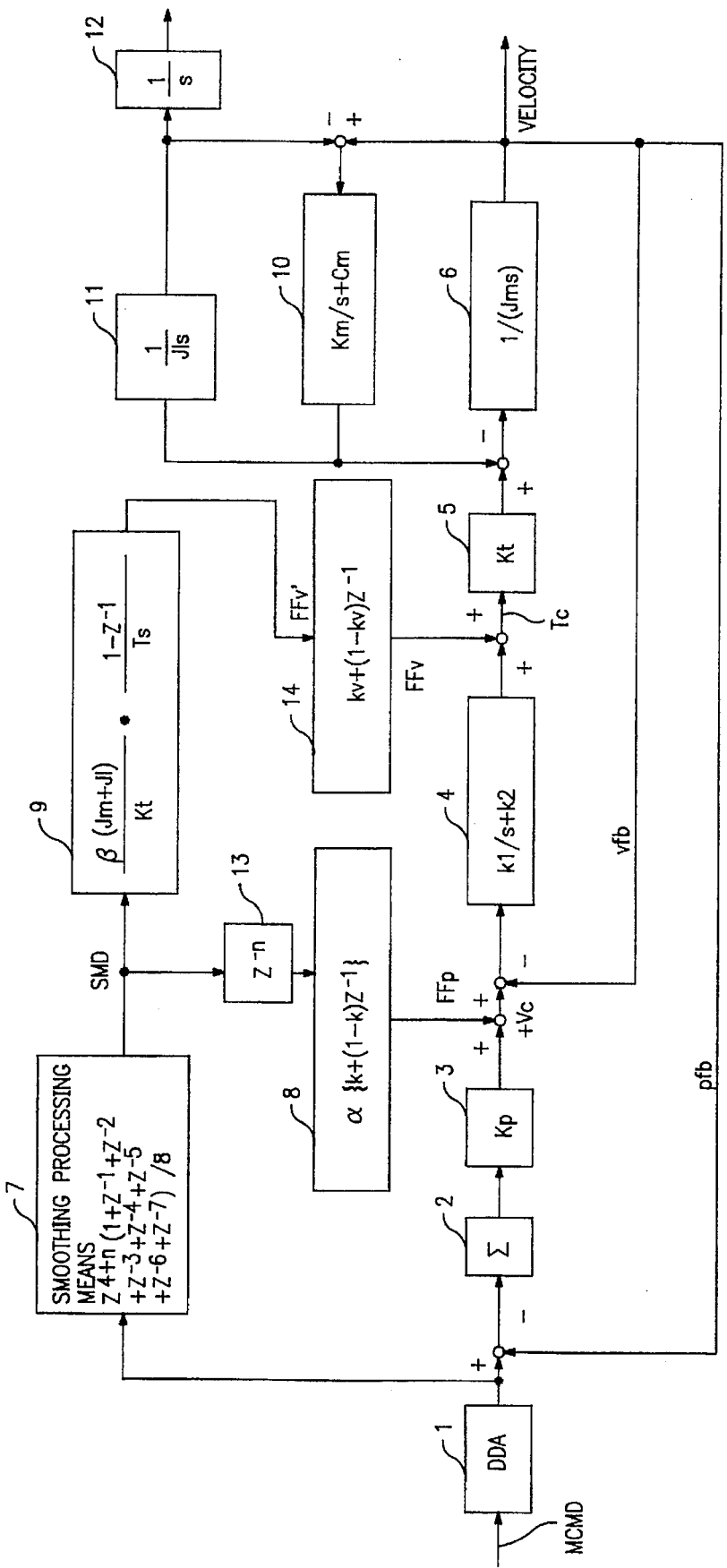
FIG. 9 is a block diagram showing an embodiment of a servo system to which the feedforward control method according to the present invention is applied.

In the control system shown in FIG. 9, operation of the time advancing term 105 in the feedforward control according to the present invention shown in FIG. 1 is carried out by means of the smoothing processing means 7 and the term 14 for adjusting a feedforward amount of velocity. The smoothing processing means 7 adopts the moving command preceding a timing of the corresponding position-velocity loop processing as processed data. In this case, a sampling period in digital processing is used as one unit, and (future) position command data advanced by an amount corresponding to n sampling is employed. Also, in this case, moving average method is applied by the smoothing processing means 7 as expressed by the following equation (2):

Mean value SMD=$Z^{d+n}$ $(1+Z^{-1}+Z^{-2} \ldots +Z^{-(N-1)})$.(divided MCMD)/N (2)

where N is a value obtained by dividing an ITP period by a period of the position-velocity loop, $Z^{-1}$ indicates a delay of a period of position-velocity loop processing, and $Z^{d+n}$ is an advancing element. In this case, N is 8, and d is 4.

To adjust the velocity compensatory component at the time of the corresponding position-velocity loop processing by means of the term 8 for adjusting a feedforward amount of the position, it is necessary to restore the phase of a mean value SMD to be inputted to the term 8. Thus, the term 13 for effecting processing of "$Z^{-n}$" is provided, and the advanced time is put back by an amount of the n sampling. After the term 18, the mean value SMD is multiplied by a feedforward coefficient α to obtain a positional feedforward amount FFp.

The term 14 is the one for adjusting an advancement amount of the velocity feedforward amount FFv' determined by the term 9, and kv is an adjusting parameter. With this adjusting parameter kv, the velocity feedforward amount FFv' determined in the term 9 undergoes a minute advancement amount adjustment within a sampling period of digital processing. Relationships between the adjusting parameter kv and an advancement amount are shown in FIGS. 6(a) and 6(b) through FIGS. 8(a) and 8(b), respectively. It is to be noted that reference character Ts in FIG. 9 means a period of the position velocity loop. Since the mean value SMD to be inputted to the term 9 uses (future) positional command data preceding by an amount corresponding to n sampling, the velocity feedforward amount FFv due to the term 14 has a value advanced by the amount corresponding to n sampling from the time of the present position-velocity loop processing, and thus precedes the positional feedforward amount FFp by the amount corresponding to n sampling.

Consequently, the time advancing term 105 in the block diagram of FIG. 1 is practiced by the smoothing processing means 7 and the adjusting term 14 in the embodiment illustrated in FIG. 9.

The moving command MCMD is outputted from a numerically controlled device such as a CNC and the like in every ITP period, and the moving commands are determined by the DDA 1 in every position-velocity period Ts. For error range 2, a positional deviation is determined from the moving command and the positional feedforward amount. The positional deviation is multiplied by a position gain Kp to determine a velocity command Vc.

On the other hand, the mean value SMD is determined by means of moving average processing using the smoothing processing means 7. In this case, the moving average processing is carried out by the use of a moving command whose phase is advanced by an amount corresponding to the n sampling period.

FIGS. 10(a), 10(b), and 10(c) are time charts each showing a moving command and a mean value SMD. FIG. 10(b)

shows the data of the smoothing processing means in the case where n is given as "2" in the above described equation (2), and the data is advanced by an amount corresponding to 2 sampling periods with respect to the moving command (a). When the data of the smoothing processing means shown in FIG. 10(b) are restored by means of the term 13 of FIG. 9 by the advanced amount of sampling periods, the result shown in FIG. 10(c) is obtained. The output in the term eventually becomes the same as conventional smoothing processed data for which advancing processing by the amount corresponding to n sampling period is not practiced by the smoothing processing means 7.

The term 8 adjusts a positional feedforward amount FFp by using the output data of the term 13, in accordance with the following equation (3):

$$Ffp = \alpha\{k + (1-k)Z^{-1}\} \quad (3)$$
$$= \alpha\{k \cdot SMD0 + (1-k)SMD1\}$$

where SMD0 represents a feedforward velocity compensatory component calculated with the present position-velocity loop processing period Ts, and SMD1 a feedforward velocity compensatory component calculated preceding by one Ts period, so that the feedforward amount is increased by the constant k of the preceding smoothing data SMD0 in the present period and is decreased by the constant k of the preceding smoothing data SMD1 calculated preceding by one Ts period. As a result, the feedforward amount FFp is advanced by a prescribed sampling period which is interiorly divided based on the constant k.

FIG. 10(d) indicates the moving mean value in the case where $\alpha$ is "1", the constant k is "1", and the phase has been advanced by an amount corresponding to one sampling period. FIG. 10(e) indicates the moving mean value in the case where $\alpha$ is "1", the constant k is "½", and the phase has been advanced by an amount corresponding to ½ sampling period. Furthermore, FIG. 10(f) indicates the moving mean value in the case where $\alpha$ is "1", the constant k is "1", and the phase is not advanced.

The positional feedforward amount FFp is added to the velocity command Vc determined by positional loop processing to obtain the velocity command VC which has undergone positional feedforward control. Then, from the velocity command Vc an amount of velocity feedback obtained from a sampling motor is subtracted to determine velocity deviation, whereby velocity loop processing is executed to determine a torque command Tc.

In the term 9 of FIG. 9, a velocity feedforward amount FFv is determined by multiplying a value obtained by differentiating a mean value SMD (obtained by subtracting a mean value SMD in the preceding period from the mean value SMD in the present period) by a constant (=(Jm+Jl)/Kt), which is dependent on a torque constant Kt, inertia Jm of a servomotor and inertia Jl of a machine connected to the servomotor, and also by a velocity feedforward coefficient $\beta$. More specifically, the calculation by the following equation (4) is performed to determine the velocity feedforward amount FFv:

$$FFv = \{\beta(Jm+Jl)/Kt\}\{(1-Z^{-1})/Ts\}SMD \quad (4)$$
$$= \{\beta(Jm+Jl)/Kt\}(SMD0-SMD1)/Ts$$

Furthermore, adjustment of a minute advancement amount is carried out with respect to the velocity feedforward amount FFv in the term 14 of FIG. 9.

In the term 14, the velocity feedforward amount FFV from the term 9 undergoes a minute adjustment of advancement amount in accordance with the following equation (5) to determine the velocity feedforward amount FFv.

$$FFv = \{kv + (1-kv)Z^{-1}\}FFv \quad (5)$$
$$= \{kv \cdot FD0 + (1-kv) \cdot FD1\}$$

where FD0 represents the velocity feedforward amount calculated with the present position-velocity loop processing period Ts, and FD1 represents the velocity feedforward amount calculated preceding by one period Ts, so that the feedforward amount is increased by the constant kv of the feedforward amount FD0 in the corresponding period and is decreased by the constant kv of the feedforward amount FD1 calculated preceding by one period Ts, and eventually the feedforward amount FFv is advanced by a prescribed time set within one sampling period of time.

The feedforward amount FFv obtained from the term 14 becomes an acceleration compensatory component with respect to a torque command Tc. FIG. 10(g) indicates an acceleration compensatory component obtained from the term 9. FIG. 10(h) indicates the acceleration compensatory component in the case where the constant kv is "1" in the above described equation (5), and the phase is advanced by an amount corresponding to one sampling period. Furthermore, FIG. 10(i) indicates the acceleration compensatory component in the case where the constant kv is "½" in the equation (5), and the phase is advanced an amount corresponding to ½ sampling period. Moreover, FIG. 10(j) indicates the acceleration compensatory component in the case where $\alpha$ is "1", the constant kv is "0" in the same equation, and the time phase is not advanced.

When the minute time advancement within one sampling period according to the term 14 is combined with the time advancement for which one sampling period in the smoothing processing means 7 is used as a unit, it becomes possible to set time advancement of an arbitrary amount.

Then, the feedforward amount FFv, as an acceleration compensatory component, is added to the torque command Tc for velocity loop processing, and a servomotor is driven by the determined torque command Tc.

Figure 11:
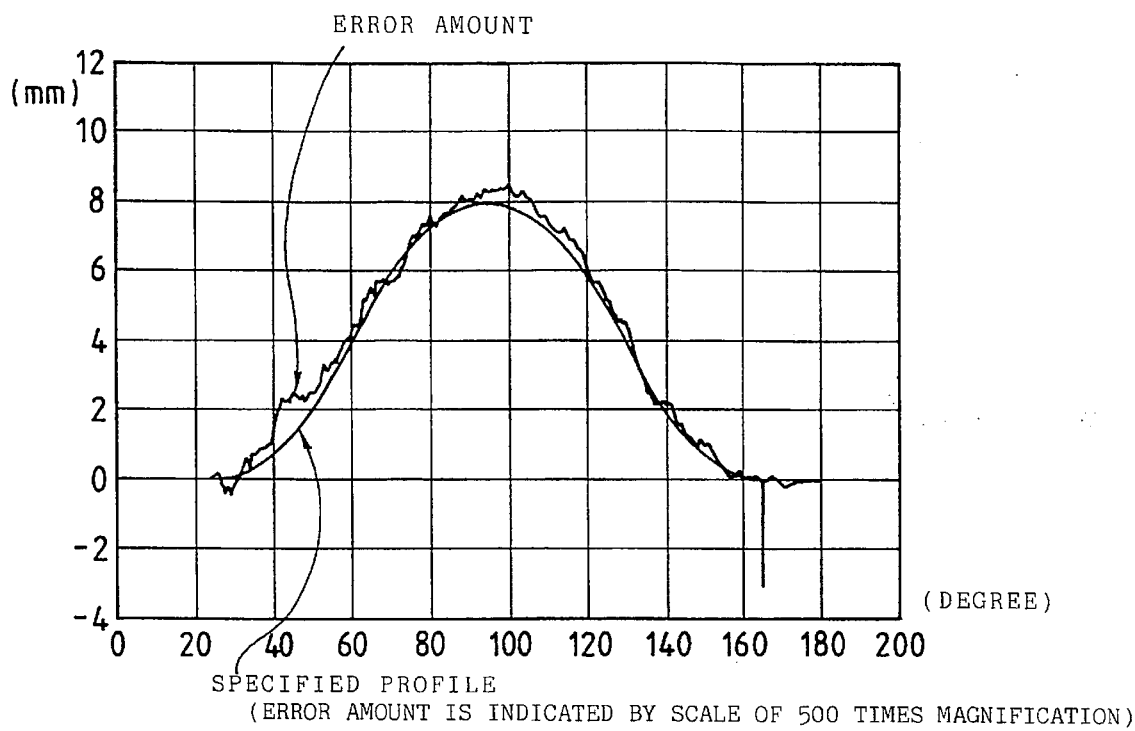
FIG. 11 is a graphical representation indicating an example of experimental results in which the feedforward control according to the present invention has been practiced.
Figure 12:
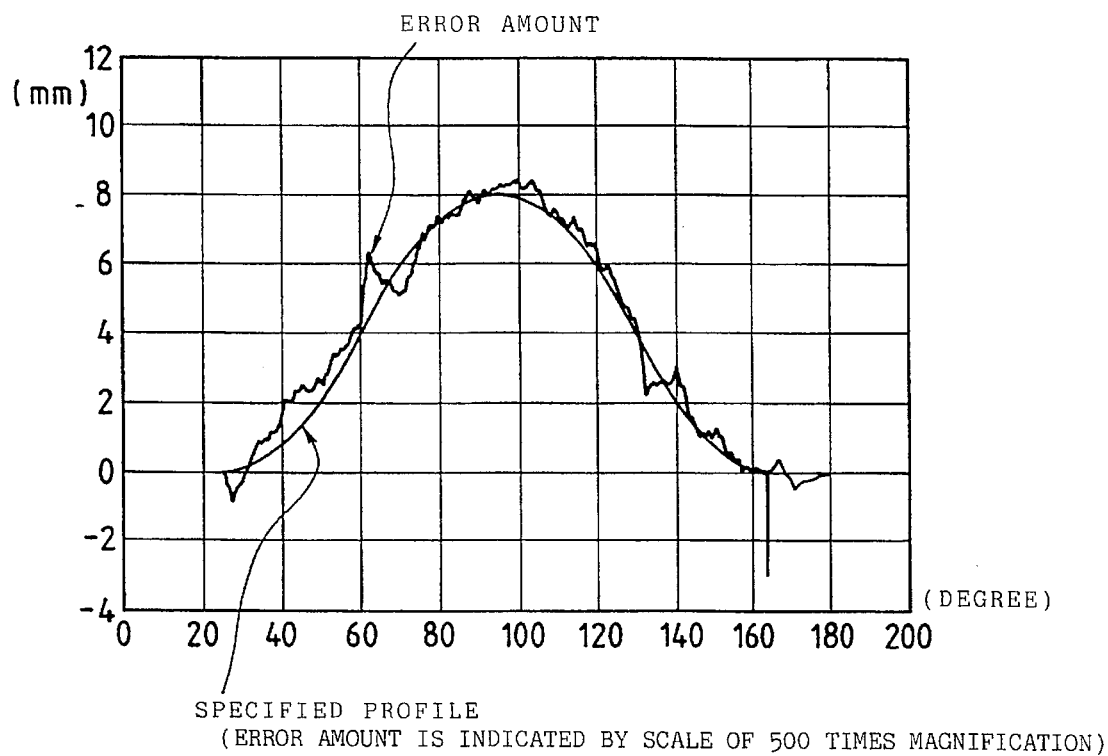
FIG. 12 is a graphical representation indicating an example of experimental results in which the feedforward control according to the present invention has not been practiced.

FIG. 11 shows an example of the experimental result according to the feedforward control of the present invention and an amount of error with respect to a specified profile. In this diagram, the amount of error is shown by the scale magnified five hundred times. On the other hand, FIG. 12 shows an example of the result an experiment wherein the feedforward control according to the present invention has not been applied, and, in this case, an amount of error is shown by the scale magnified five hundred times as in the case of FIG. 11.

According to the feedforward control of the present invention, delay in the rise of a current loop is compensated to reduce the amount of error of specified profile, whereby a good command follow-up capability can be obtained.

What is claimed is:

1. A method of feedforward control for a servomotor, to control the servomotor through position-velocity loop control to be executed by a moving command in each sampling period obtained by dividing a present distribution period of the moving command into N equal parts, said method comprising the steps of:

reading a moving command in a distribution period preceding by one period the present distribution period to determine a moving command for each position-velocity loop processing, multiplying the determined moving command by a positional feedforward coefficient to produce a positional feedforward amount, performing positional loop processing to obtain a velocity command, and adding the position feedforward amount to the velocity command obtained by positional loop processing to determine the velocity command with respect to velocity loop processing; and determining a moving command preceding the time of the present position-velocity loop processing, multiplying a differentiated value of the obtained moving command by a velocity feedforward coefficient so produce a velocity feedforward amount, performing velocity loop processing to produce a torque command, and adding the velocity feedforward amount to the torque command obtained by velocity loop processing to determine a torque command to the servomotor.

2. A method of feedforward control for a servomotor according to claim 1, further comprising the step of setting the time precedence substantially equal to one sampling period.

3. A method of feedforward control for a servomotor, to claim 1, further comprising the step of setting the time precedence within one sampling period.

4. A method of feedforward control for a servomotor, to control the servomotor through position-velocity loop control to be executed by a moving command obtained in each sampling period obtained by dividing a moving command obtained in each sampling period obtained by dividing a present distribution period of the moving command into N equal parts, said method comprising the steps of:

reading a moving command in a distribution period preceding by one period the present distribution period to determine a moving mean value of moving commands corresponding to N units of position-velocity loop processing periods centering around the period of each position-velocity loop processing, multiplying the determined moving mean value by a positional feedforward coefficient to produce a positional feedforward amount, performing positional loop processing to determine a velocity command, and adding the positional feedforward amount to the velocity command obtained by positional loop processing to determine the velocity command with respect to velocity loop processing; and determining a moving mean value of moving commands corresponding to N units of position-velocity loop processing periods centering around the time preceding the period of the present position-velocity loop processing, multiplying a differentiated value of the obtained moving mean value by a velocity feedforward coefficient to produce a velocity feedforward amount, performing velocity loop processing to produce a torque command, and adding the velocity feedforward amount to the torque command obtained by velocity loop processing to determine a torque command to the servomotor.

5. A method of feedforward control for a servomotor according to claim 4, further comprising the step of setting the time precedence substantially equal to one sampling period.

6. A method of feedforward control for a servomotor according to claim 4, further comprising the step of setting the time precedence within one sampling period.

7. A method of feedforward control for a servomotor, to control the servomotor through position-velocity loop control to be executed by a moving command in each sampling period obtained by dividing a present distribution period of the moving command into N equal parts, said method comprising the steps of:

reading a moving command in a distribution period preceding by one period the present distribution period to determine a moving command for each position-velocity loop processing, to produce a velocity compensatory component;

determining a moving average value of moving commands corresponding to N units of position of moving commands, corresponding to N units of position-velocity loop processing periods centering around the period preceding the period of the position-velocity loop processing used to obtain the velocity compensatory component, differentiating the moving average value and multiplying the differentiated value by a velocity feedforward coefficient, to produce an acceleration compensatory component;

performing velocity loop processing using the velocity compensatory component to produce a torque command;

advancing a phase of the acceleration compensatory component from that of the velocity compensatory component; and adding the phase advanced acceleration compensatory component to the torque command, to produce a new torque command to the servomotor.

8. A method of feedforward control for a servomotor according to claim 7, wherein the step of advancing the phase comprises adjusting the phase by the unit of one of the sampling periods.

9. A method of feedforward control for a servomotor according to claim 7, wherein the step of advancing the phase comprises adjusting the phase by a fraction of one of the sampling periods.

10. A method of feedforward control for a servomotor according to claim 7, wherein the step of advancing the phase comprises adjusting the phase by a combination of the unit of one of the sampling periods and a fraction of the one of the sampling periods.

11. A method of feedforward control for a servomotor according to claim 7, wherein the step of advancing the phase comprises adjusting the phase by adding a fraction of the acceleration compensatory component having a phase advancement of one sampling period to a remainder of the acceleration compensatory component other than the fraction which is not phase advanced.

* * * * *